United States Patent Office 2,866,828
Patented Dec. 30, 1958

2,866,828

PRODUCTION OF DIHALOBENZENES

John A. Crowder, Uniondale, and Everett E. Gilbert, Flushing, N. Y., assignors to Allied Chemical Corporation, a corporation of New York No Drawing. Application September 4, 1953
Serial No. 378,671

8 Claims. (Cl. 260—650)

This invention relates to preparation of dihalobenzenes. In certain of its aspects it is concerned with methods according to which meta- and other isomeric forms of dihalobenzenes, useful in manufacture of dyestuffs or as chemical intermediates, may be prepared directly from trihalobenzenes.

Processing of trihalobenzenes containing a single halogen species has not heretofore been attempted to prepare corresponding dihalobenzenes. The latter compounds have customarily been prepared commercially only by the halogenation of benzene or the monohalobenzene.

The preparation of metadihalobenzenes in particular has always been a matter of difficulty. They are not currently obtained in commercial practice in appreciable quantities along with the ortho- and para-isomers by the direct halogenation of benzene or monohalobenzene. In the chlorination of benzene in the presence of iron catalysts, for example, the dichlorobenzene fraction may contain about 39% of the ortho-isomer, about 55% of the para-isomer along with only about 5% of the meta-dichlorobenzene. As a result of the inability of direct procedures to effect satisfactory preparation of the meta-isomer, indirect procedures have been resorted to, but those employed have been defective in that they are attended by use of undesirable conditions or expensive starting materials, intermediates, and catalysts, or production of low yields of desired product in difficultly recoverable relation with undesirable by-products.

One object of the present invention is to prepare dihalobenzenes directly from trihalobenzenes by a process which is simple and economical. A second object is to produce desired metadihalobenzene in improved yield. Other objects will be apparent from the following detailed description.

This invention in certain of its aspects comprises a new method of preparing dihalobenzenes by the reduction with hydrogen in the presence of a hydrogenation catalyst, of a trihalobenzene containing but a single species of halogen, i. e. only fluorine, only chlorine, or only bromine. These materials may be reduced according to the process of this invention to give good yields of the dihalobenzene product, according to the following reaction, for example:

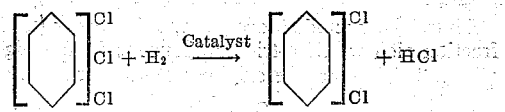

This invention in certain of its other aspects comprises a new method of preparing dihalobenzenes by the reduction with hydrogen in the presence of a hydrogenation catalyst, of a trihalobenzene containing but a single species of halogen, i. e. only fluorine, only chlorine, or only bromine, and having at least two halogen atoms in meta-position with respect to each other and a maximum of two halogen atoms in ortho-position with respect to each other, such as 1,3,5-trihalobenzene or 1,2,4-trihalobenzene. Preferred starting materials include 1,2,4-trifluorobenzene and 1,3,5-trifluorobenzene; 1,2,4-trichlorobenzene and 1,3,5-trichlorobenzene; and 1,2,4-tribromobenzene and 1,3,5-tribromobenzene. These materials may be reduced according to the process of this invention to give good yields of the dihalobenzene product, containing appreciable amounts respectively of metadifluorobenzene, metadichlorobenzene, and metadibromobenzene, according to the following reactions, for example:

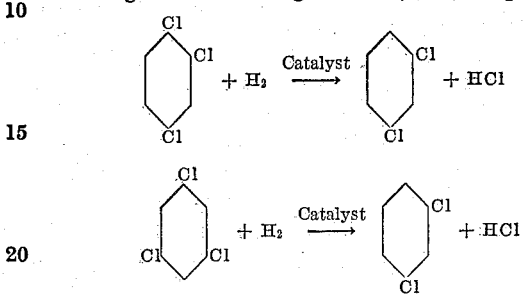

This invention in certain of its other aspects comprises a new method of preparing substantially pure orthodihalobenzenes, such as orthodifluorobenzene, orthodichlorobenzene, or orthodibromobenzene, substantially free of the corresponding meta- or para-isomers, from 1,2,3-dihalobenzene by reduction with hydrogen in the presence of a hydrogenation catalyst, according to the following reaction, for example:

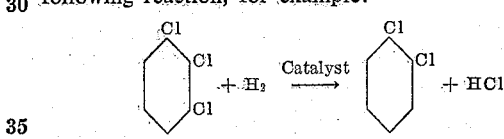

The reaction may be conducted in the presence of a hydrogenation catalyst comprising for example, platinum, palladium, nickel, nickel chromite or copper chromite, the catalysts being listed generally in order of decreasing activity. Preferably the catalyst is suspended on porous, high-surface material such as active carbon or pumice. When employing platinum or palladium catalyst, suspended on active carbon, preferred concentration of catalyst is 0.2%–0.5% by weight of the e. g. carbon or pumice, higher concentrations showing no significant increase in activity. Preferred platinum or palladium catalyst may be prepared for example by adding solutions of platinic chloride or palladous chloride to moistened charcoal, and evaporating to dryness over a steam bath. When copper chromite and nickel chromite are used as catalysts their performance may be optionally improved by pretreatment with a gaseous fluorinating agent followed by treatment with moist air for one hour at 200° C.

In practice of the invention, as has been seen above, the 1,3,5- and 1,2,3-isomers of trihalobenzene starting material dehalogenate respectively to the meta- and ortho-dihalo-products. If, however, the charge material is the 1,2,4-trihalo-isomer or is a mixture containing this substance, all of the isomeric forms of the dihalogenated product may be formed. It is one of the features of this invention that by proper control of the dehalogenation conditions, the conveniently available 1,2,4-trihalo-compound may be selectively dehalogenated to obtain high yields of either the meta- or the ortho-dihalo-products or both, as dictated by need for the same.

One method of directing the course of the reaction toward formation of the meta- or ortho-products is by choice of catalyst of proper activity. Catalysts of high dehalogenation activity, as exemplified by platinum-on-carbon, tend to form under proper operating conditions little or no para-product while giving relatively high yields of both meta- and ortho-products. Use of a less active catalyst, such as nickel chromite, favors production of more total meta-product. The higher activity catalysts are of particular value when during the production of meta-dihalo-products from 1,2,4-trihalobenzene, it is desired to produce, the ortho-isomer as major by-product. Thus, in the dehalogenation of 1,2,4-trihalobenzene under otherwise similar conditions, it is found for example that the ratio of orthodihalobenzene to metadihalobenzene in the dehalogenated product will be above three when employing platinum-on-carbon catalyst, and about one when employing nickel chromite.

In the production of metadihalobenzene by dehalogenation of 1,2,4-trihalobenzene with catalyst of high activity the reaction may also be controlled to yield predominantly the ortho-isomer as by-product by use of substantially the theoretical molar charge ratio of hydrogen to trihalobenzene. Control of the reaction to yield increasing amounts of para-isomer as by-product in production of meta-isomer, may be obtained by use of less than the theoretical ratio of hydrogen to trihalobenzene with little or no sacrifice in yield of the meta-. For example, if the molar charge ratio is decreased from 1.0 to 0.33, yield of para-product is doubled and a corresponding reduction in yield of ortho- is noted.

If major emphasis is to be placed on ortho- as product from 1,2,4 charge or as by-product of meta-production, with little or no accompanying para-, this result may be achieved with high activity catalyst by use, for example, of sufficiently high residence time to obtain higher overall conversion, say above 95% of the 1,2,4-trihalobenzene to the dihalobenzene. At such conversion, yield of para- may be nil. As the residence time is decreased, say to about 80%–85% overall conversion, higher yields of para-isomer, say up to about 15% may be obtained as by-product in the production of meta-isomer.

The lower limit of the range of permissible reaction temperature is limited only by the fact that it is preferably at least as high as the boiling point of the trihalobenzene which is being reduced and by the minimum temperature required to insure adequate catalyst activity. The upper limit of the range is limited by possibility of pyrolytic effects forming undesirable by-products, and by the possible deactivation of the catalyst. Preferred temperature of operation in the catalyst bed is from 250° C. to 500° C., say 400° C. The trihalobenzene may be carried into the reaction chamber in the form of a mist or spray of liquid suspended in the gas stream, and under these conditions, the temperature may be slightly lower than that indicated.

The temperature may advantageously be varied during the course of a run. For example, when a freshly prepared platinum catalyst is employed, the reaction may be conducted at e. g. 250° C. Maintenance of high conversion during the first few hours of reaction is desirably accomplished by gradually raising the temperature to 350° C.–375° C. High activity may be maintained at this temperature for 180–200 hours. Subsequently it may be desirable to increase the temperature to a maximum of 500°C.–600° C. Preferred increases when performed should be in small increments, say 5° C.; otherwise loss of net conversion may occur. Use of this procedure considerably extends the life of the catalyst between regenerations, to e. g. 750–1000 hours for 0.5% platinum on carbon.

Pressures under the noted conditions of operation may be 1 p. s. i. g.–5 p. s. i. g., with preferred pressure of about 2 p. s. i. g. The reaction proceeds satisfactorily with a residence time of about 0.5 to 2 minutes, say one minute although shorter or longer residence time may be used; and the separation and purification of the desired dihalobenzene products may be effected by conventional procedures. Yield of 50% to 90% of dihalobenzenes may be obtained, and of this fraction as much as 25% to 100% may be metadihalobenzene or ortho-isomers. This represents higher yields of the meta-isomer than are obtainable by other processes which are commercially available. In these reactions, yields obtained when using commercial trihalobenzene may be increased and more readily controlled by employing pure charge material.

Products of the reaction, as found, for example, in the preparation of metadichlorobenzene, may include: hydrogen chloride which may be recovered as such; unreacted hydrogen and trichlorobenzene which may be recycled; monochlorobenzene, which may be readily recovered as such or rechlorinated; and the dichlorobenzene fraction. After separation of the components of the latter fraction, if more than one isomer is formed, ortho- and para-dichlorobenzene by-product may be chlorinated to produce more trichlorobenzene starting material. By-product dihalobenzenes may alternatively be withdrawn from the process to be marketed as such.

*Example I*

In typical practice of the invention, a trihalogenated benzene fraction which has been recovered as by-product from the chlorination of benzene to produce benzene hexachloride, was reacted with hydrogen in the presence of nickel chromite for an appropriate time until reaction has occurred to produce dichlorobenzene containing substantial amounts of the meta-isomer.

724 parts by weight of the trichlorobenzene fraction containing approximately 70% by weight of 1,2,4-trichlorobenzene and 30% by weight of 1,2,3-trichlorobenzene were mixed with 80% molar excess of hydrogen. The gas phase mixture was passed for 16.5 hours over a 14 mesh nickel chromite catalyst suspended on inert calcium fluoride. The catalyst was pretreated with a gaseous mixture of 60% nitrogen–40% hydrogen fluoride at 150° C. until hydrogen fluoride was detected in the effluent, followed by moist air for one hour at 200° C. Average pressure was 1 p. s. i. g., and average temperature was 350° C. during the course of the run. Residence time was approximately one half minute. Approximately 63.5% of the charge trichlorobenzene was converted to the average dichlorobenzene stage.

Distillation of effluent from the hydrogenation step gave fractions as follows:

| Product | Parts by weight | Percent | Boiling range (° C.) |
|---|---|---|---|
| Benzene | 8 | 6.9 | 78–82 |
| Chlorobenzene | 34 | 29.6 | 130–140 |
| Mixed Dichlorobenzenes | 74 | 63.5 | 170–180 |

The dichlorobenzene fraction indicated was separated by conventional distillation and crystallization procedures into components proportioned as follows:

| Isomer | Wt. Percentage |
|---|---|
| ortho- | 32 |
| meta- | 27 |
| para- | 40 |

Thus, the metadichlorobenzene is recovered from a fraction rich in 1,2,4-trichlorobenzene in the high yield of 17.2% based on the original trichlorobenzene mixture.

*Example II*

According to a particular embodiment of this invention, 1,3,5-trihalogenated benzene, such as 1,3,5-trichlorobenzene may be reacted with hydrogen in the presence of a platinum-on-active-carbon catalyst for an appropriate time until reaction has occurred to produce a dichlorobenzene fraction of substantially pure metadichlorobenzene.

284 parts by weight of 1,3,5-trichlorobenzene were mixed with 5.5% molar excess hydrogen and passed for 12 hours over an 8-14 mesh catalyst containing 0.5% platinum on active carbon. Average pressure was 1 p. s. i. g. and average temperature was 375° C. Residence time was approximately one minute. During the course of the run, approximately 80% of the hydrogen charged was converted to hydrogen chloride. Distillation of the product from the hydrogenation step gave pure fractions as follows:

| Product | Parts by weight | Percent | Boiling Range, °C. |
|---|---|---|---|
| Benzene | 6.8 | 5.7 | 78-82 |
| Chlorobenzene | 35.3 | 29.3 | 130-140 |
| Dichlorobenzene | 78.5 | 65 | 172-174 |

Analysis of the dichlorobenzene fraction indicated that metadichlorobenzene was the only dichlorobenzene isomer present. Thus metadichlorobenzene is recovered from the reduction of 1,3,5-trichlorobenzene in the amount of 65% of the reduced products.

Example III

According to another particular embodiment of this invention a 1,2,3-trihalogenated benzene such as a 1,2,3-trichlorobenzene may be reacted with hydrogen in the presence of platinum-on-carbon catalyst for an appropriate time until reaction has occurred to produce dichlorobenzene containing substantially pure orthodichlorobenzene.

416 parts of 1,2,3-trichlorobenzene were mixed with 5.5% molar excess hydrogen and passed for 12 hours over an 8-14 mesh catalyst containing on the average 0.5% platinum on active carbon. Average pressure was 1 p. s. i. g. and average temperature was 350° C. Residence time was approximately 0.7 minutes. During the course of the run, approximately 92% of the hydrogen charged was converted to hydrogen chloride. Distillation of reaction product from the hydrogenation step gave reduced fractions as follows:

| Product | Parts by weight | Percent | Boiling Range, °C. |
|---|---|---|---|
| Benzene | 11.5 | 7.84 | 78-82 |
| Chlorobenzene | 37.0 | 25.25 | 130-140 |
| Dichlorobenzene | 98.0 | 66.9 | 172-179 |

Analysis of the dichlorobenzene fraction from the above separation indicated the following composition:

| Compound | Percent |
|---|---|
| o-Dichlorobenzene | 96.0 |
| m-Dichlorobenzene | 1.5 |
| p-Dichlorobenzene | 0 |

Example IV

According to another particular embodiment of this invention a 1,2,4-trihalogenated benzene such as 1,2,4-tribromobenzene may be reacted with hydrogen in the presence of platinum catalyst for an appropriate time until reaction has occurred to produce substantial amounts of ortho-isomer and appreciable quantities of meta-isomer.

122 parts by weight of 1,2,4-tribromobenzene were vaporized and mixed with 5.5% molar excess hydrogen. This mixture was passed over 50 cc. of an 8-14 mesh catalyst containing 0.5% platinum on active carbon. Average pressure was 1 p. s. i. g. and average temperature was 350° C. The time required for complete passage of the gas mixture over the catalyst was 5.25 hrs. Residence time was approximately 1.8 minutes. Approximately 85% of the hydrogen charged was converted to hydrogen bromide. Distillation of product from the hydrogenation step gave pure fractions as follows:

| Product | Parts by weight | Percent | Boiling Range, °C. |
|---|---|---|---|
| Benzene | 0.55 | 1 | 80-82 |
| Bromobenzene | 14.0 | 25.3 | 145-160 |
| Dibromobenzene | 31.8 | 57.4 | 215-225 |
| Tribromobenzene | 9.05 | 16.3 | Residue |

The dibromobenzene fraction was analyzed to obtain the isomer distribution. The results are given in the following table:

| Compound | Percent |
|---|---|
| o-dibromobenzene | 74 |
| m-dibromobenzene | 9 |
| p-dibromobenzene | 17 |

This result resembles the average isomer distribution in the product obtained by the reduction of 1,2,4-trichlorobenzene.

According to another particular embodiment of this invention a 1,3,5-trihalogenated benzene, such as 1,3,5-trifluorobenzene may be reacted with hydrogen in the presence of platinum catalyst for an appropriate time until reaction has occurred to produce difluorobenzene containing substantially pure meta-isomer. In typical procedure the starting 1,3,5-trifluorobenzene may be vaporized and mixed with an equimolar amount of hydrogen, the mixture being then passed over 8-14 mesh platinum-on-carbon catalyst containing 0.5% platinum. Average pressure may be 1 p. s. i. g. to 5 p. s. i. g., say 2 p. s. i. g., and temperature may be 250° C.–500° C., say 400° C. Residence time may be 0.5 to 2 minutes, say about one minute. During the course of the run, up to 80% of the hydrogen charge may be converted to hydrogen fluoride. Distillation of the product produces as much as 65% by weight of the difluorobenzene cut, which is substantially pure metadifluorobenzene.

In the claims the term "halogen" and its derivatives are intended to include fluorine, chlorine, and bromine. The term "homotrihalobenzene" is intended to designate those trihalobenzenes containing halogen atoms of a single species only e. g. trichlorobenzene, trifluorobenzene, or tribromobenzene. When copper chromite and nickel chromite are referred to, it is intended to refer to the compounds pretreated as hereinbefore indicated, as well as to the chromite compounds subjected to other activating treatments.

We claim:

1. The method of preparing metadihalobenzene which comprises reacting a charge material selected from the group consisting of 1,2,4-homotrihalobenzene and 1,3,5-homotrihalobenzene with an approximately equimolar amount of hydrogen in the presence of an active hydrogenation catalyst selected from the group consisting of platinum, palladium, nickel, nickel chromite, and copper chromite, said reaction being conducted at temperature between the boiling point of said charge material and 600° C.

2. The method of preparing metadihalobenzene which comprises reacting 1,2,4-homotrihalobenzene with an approximately equimolar amount of hydrogen in the presence of an active hydrogenation catalyst selected from the group consisting of platinum, palladium, nickel, nickel chromite, and copper chromite, said reaction being conducted at temperature between 250° C. and 600° C.

3. The method of preparing metadihalobenzene which comprises reacting 1,3,5-homotrihalobenzene with an approximately equimolar amount of hydrogen in the presence of an active hydrogenation catalyst selected from the group consisting of platinum, palladium, nickel, nickel chromite, and copper chromite, said reaction being conducted at temperature between 250° C. and 600° C.

4. The method of preparing metadichlorobenzene which comprises reacting 1,2,4-trichlorobenzene with an approximately equimolar amount of hydrogen in the presence of an active hydrogenation catalyst selected from the group consisting of platinum, palladium, nickel, nickel chromite, and copper chromite, said reaction being conducted at temperature between the boiling point of said 1,2,4-trichlorobenzene and 600° C.

5. The method of preparing metadichlorobenzene which comprises reacting 1,2,4-trichlorobenzene in the gas phase with an approximately equimolar amount of hydrogen at 375° C. in the presence of an active hydrogenation catalyst comprising about 0.5% by weight of platinum suspended on carbon.

6. The process of preparing metadichlorobenzene which comprises reacting 1,2,4-trichlorobenzene with from about 0.3 to 1.0 mol of hydrogen per mol of said trichlorobenzene in the presence of a hydrogenation catalyst selected from the group consisting of platinum, palladium, nickel and copper chromite, said reaction being conducted at a temperature between about 300° C. and 500° C.

7. The process of preparing metadichlorobenzene which comprises reacting 1,3,5-trichlorobenzene with from about 0.3 to about 1 mol of hydrogen per mol of trichlorobenzene in the presence of a hydrogenation catalyst selected from the group consisting of platinum, palladium, nickel and copper chromite, said reaction being conducted at a temperature between about 300° C. and 500° C.

8. The process of preparing methadihalobenzene which comprises reacting a charge material selected from the group consisting of 1,2,4-homotrihalobenzene and 1,3,5-homotrihalobenzene with from about 0.3 to about 1.8 mols of hydrogen per mol of trihalobenzene in the presence of a hydrogenation catalyst selected from the group consisting of platinum, palladium, nickel, nickel chromite and copper chromite, said reaction being conducted at a temperature between the boiling point of said charge material and 600° C.

References Cited in the file of this patent

UNITED STATES PATENTS

| 2,025,032 | Arnold et al. | Dec. 24, 1935 |
| 2,560,950 | Head | July 17, 1951 |
| 2,725,405 | Britton et al. | Nov. 25, 1955 |

OTHER REFERENCES

Sabatier: "Catalysis in Organic Chemistry," pp. 148–9 (1922).

Busch et al.: "Ber. der deut. chem. Gessell.," vol. 62B, pages 2612–20 (1929).

Berkman et al.: "Catalysis," page 833 (1940).